United States Patent
Blackmon et al.

(10) Patent No.: US 10,337,305 B2
(45) Date of Patent: Jul. 2, 2019

(54) PROCESS FOR REMOVING DISSOLVED GAS FROM AN EVAPORATOR FEED STREAM

(71) Applicant: Veolia Water Technologies, Inc., Moon Township, PA (US)

(72) Inventors: Robert Blackmon, Getxo (ES); Mikel Garcia, Getxo (ES); Mark D. Patterson, Aurora, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 467 days.

(21) Appl. No.: 15/144,876

(22) Filed: May 3, 2016

(65) Prior Publication Data

US 2017/0321527 A1    Nov. 9, 2017

Related U.S. Application Data

(60) Provisional application No. 62/159,233, filed on May 9, 2015.

(51) Int. Cl.
| | |
|---|---|
| *E21B 43/24* | (2006.01) |
| *E21B 43/40* | (2006.01) |
| *B01D 19/00* | (2006.01) |
| *C02F 9/00* | (2006.01) |
| *C02F 1/20* | (2006.01) |

(Continued)

(52) U.S. Cl.
CPC ............ *E21B 43/24* (2013.01); *B01D 19/001* (2013.01); *B01D 19/0005* (2013.01); *B01D 19/0036* (2013.01); *B01D 19/0063* (2013.01); *C02F 9/00* (2013.01); *E21B 43/40* (2013.01); *C02F 1/048* (2013.01); *C02F 1/20* (2013.01); *C02F 1/40* (2013.01); *C02F 1/66* (2013.01); *C02F 2101/10* (2013.01); *C02F 2101/101* (2013.01); *C02F 2301/063* (2013.01)

(58) Field of Classification Search
CPC ..... E21B 43/24; E21B 43/40; B01D 19/0005; B01D 19/001; B01D 19/0036; B01D 19/0063; C02F 9/00
See application file for complete search history.

(56) References Cited

U.S. PATENT DOCUMENTS

| | | |
|---|---|---|
| 3,968,002 A | 7/1976 | Standiford |
| 4,260,461 A | 4/1981 | Pottharst, Jr. |

(Continued)

FOREIGN PATENT DOCUMENTS

RU    2242672 C1    12/2004

OTHER PUBLICATIONS

RU Search Report dated Apr. 9, 2018 in re RU Application No. 2017135284 filed Oct. 5, 2017.

*Primary Examiner* — Matthew R Buck
(74) *Attorney, Agent, or Firm* — Coats & Bennett PLLC

(57) ABSTRACT

A method for treating produced water or a feedwater stream with an evaporator. The feedwater stream or produced water is directed to and through a deaerator located upstream of the evaporator. Steam produced by the evaporator is utilized to strip dissolved gases from the produced water or feedwater stream passing through the deaerator. To efficiently strip dissolved gases, the vapor pressure in the deaerator is maintained at below atmospheric pressure and the produced water or feedwater stream is heated to a temperature greater than the saturated vapor temperature in the deaerator.

18 Claims, 2 Drawing Sheets

(51) Int. Cl.
*C02F 1/04* (2006.01)
*C02F 101/10* (2006.01)
*C02F 1/40* (2006.01)
*C02F 1/66* (2006.01)

(56) References Cited

U.S. PATENT DOCUMENTS

| | | | |
|---|---|---|---|
| 5,587,054 A | 12/1996 | Keith | |
| 8,469,091 B2* | 6/2013 | Bjorklund | E21B 41/0057 |
| | | | 166/266 |
| 8,899,326 B2* | 12/2014 | Vasudevan | C02F 9/00 |
| | | | 122/6 R |
| 9,738,553 B2* | 8/2017 | Chidambaran | B01D 9/00 |
| 2006/0032630 A1* | 2/2006 | Heins | C02F 1/04 |
| | | | 166/266 |
| 2008/0196894 A1 | 8/2008 | Minnich et al. | |
| 2009/0056945 A1* | 3/2009 | Minnich | E21B 43/24 |
| | | | 166/272.3 |
| 2012/0145386 A1* | 6/2012 | Bjorklund | B01D 1/065 |
| | | | 166/266 |
| 2015/0292314 A1* | 10/2015 | Xia | C02F 9/00 |
| | | | 166/266 |

* cited by examiner

US 10,337,305 B2

PROCESS FOR REMOVING DISSOLVED GAS FROM AN EVAPORATOR FEED STREAM

This application claims priority under 35 U.S.C. § 119(e) from the following U.S. provisional application: Application Ser. No. 62/159,233 filed on May 9, 2015. That application is incorporated in its entirety by reference herein.

FIELD OF THE INVENTION

The present invention relates to processes for removing dissolved gases from an evaporator feed stream and, in one embodiment, the present invention relates to a process for treating produced water with an evaporator and removing dissolved gas from the feedwater stream prior to reaching the evaporator.

BACKGROUND OF THE INVENTION

Many industrial processes employ evaporators to purify wastewater streams. Many such wastewater streams include dissolved gases, such as $CO_2$ and $H_2S$, that tend to scale, foul or corrode heat transfer tubes in the evaporator. Thus, it is known to provide processes, such as striping with gas, for removing dissolved gases in evaporator feed streams. However, the energy requirements for removing dissolved gas and conditioning the wastewater stream so that effective dissolved gas removal is made possible is substantial. There has been and continues to be a need for effective and cost efficient processes for removing dissolved gases from evaporator feed streams.

SUMMARY OF THE INVENTION

The present invention relates to a system and process for removing dissolved gases such as $H_2S$ and $CO_2$ from an evaporator feed stream. Steam vented from a downstream evaporator is directed into the deaerator for stripping dissolved gases from the feed stream. In particular, in one embodiment, the steam removes or strips $H_2S$ and $CO_2$. The pressure, and hence the temperature of the vapor in the deaerator is established, in part at least, by a pressure drop that occurs in the vent steam between the evaporator and the deaerator. This pressure drop functions to maintain the vapor pressure in the deaerator significantly lower than the pressure of the vent stream exiting the evaporator heated shell, typically lower than atmospheric pressure. This, coupled with heating or maintaining the temperature of the feed stream above the saturated vapor temperature in the deaerator, provides for the effective and efficient removal of dissolved gases from the feed stream. This process reduces the amount of steam required to remove dissolved gases from a feed stream and, at the same time, eliminates the need for waste gas stripping of the evaporator feed streams from such processes as oil waste or produced water processes.

DESCRIPTION OF EXEMPLARY EMBODIMENTS

The present invention relates to a process for removing dissolved gas from an evaporator feed stream. The evaporator feed stream is directed into a deaerator-gas stripper (hereafter referred to as deaerator) that is operated at a pressure significantly below the pressure within the downstream evaporator heater shell (below atmospheric pressure). The pressure conditions in the deaerator is established, in part at least, by a pressure reduction in a vent steam line leading from a downstream evaporator to the deaerator. Further, the process entails heating the evaporator feed stream or at least maintaining a certain feed stream temperature such that the temperature of the feed stream prior to entering the deaerator is above the saturated vapor temperature in the deaerator.

Figure 1:
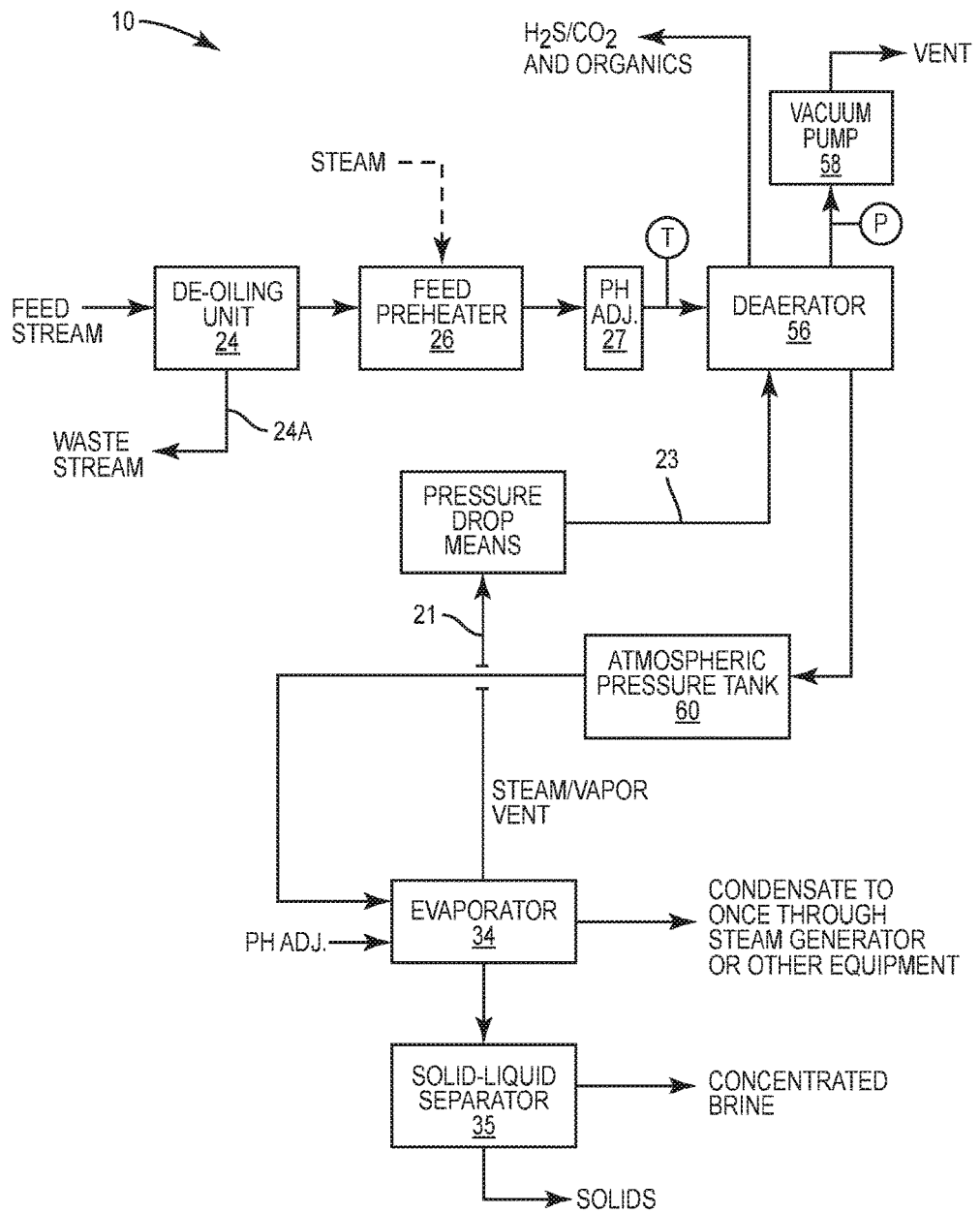
FIG. 1 is a schematic illustration of a process for removing dissolved cases from an evaporator feed stream.

Turning to FIG. 1, an exemplary process is disclosed. A feed stream, such as a produced water stream may include oil and, in such cases, is directed to a de-oiling unit 24. De-oiling unit 24 separates oil from the feed stream and yields a waste stream 24A that includes the separated oil. In some evaporator feed streams, there is no oil or any significant amount of oil and, in those cases, a de-oiling unit will not be required. In many conventional processes, at this point the evaporator feed stream is directed to a waste gas stripper. That is not required in the process discussed herein. After separating oil from the feed stream, the feed stream is directed to a feed preheater 26. Preheater 26 can assume various forms. In one embodiment, live steam is directed into the preheater 26 to heat the feed stream. As will be discussed subsequently herein, the preheater heats the feed stream such that it includes a temperature that is significantly higher than the saturated vapor temperature in a downstream deaerator 56. In one example, the temperature of the feed stream prior to entering the deaerator 56 is higher than the saturated vapor temperature in the deaerator.

In this exemplary process, downstream of the feed preheater 26 there can be a pH adjustment to the feed stream. An acid can be added to the feed stream to lower the pH of the feed stream. This has the effect of converting alkalinity, bicarbonate and carbonate, to carbon dioxide. A temperature sensor T is located between the feed preheater 26 and the deaerator 56. Temperature sensor T senses the temperature of the feed stream and in one exemplary process is communicatively linked to a controller that controls the heating of the feed stream by the feed preheater 26.

The feed stream is pumped into the deaerator 56 and flows downwardly therethrough. As discussed below, a steam or vapor stream from a downstream evaporator 34 is directed upwardly through the deaerator in a counterflow relationship to the feed stream and in the process various dissolved gases are removed from the feed stream. In the case of one embodiment, the targeted dissolved gases are $H_2S$, $CO_2$, and various organics. It will be appreciated by those skilled in the art that other dissolved gases can be removed in the deaerator 56.

Deaerator 56 is operated at a pressure less than atmospheric pressure. Expressed in another way, the deaerator 56 is a vacuum deaerator. There are various ways and means of maintaining a vacuum in the deaerator 56. In the example shown in FIG. 1, a vacuum pump 58 is operative to generate a vacuum in the deaerator 56. A vent line is operatively interconnected between the deaerator 56 and the vacuum pump 58. A pressure sensor P is operatively connected in this line. It is seen from FIG. 1 where there is a vent stream emitted from the vacuum pump 58. The function of the vacuum pump 58 is to maintain a vacuum in the deaerator 56. Pressure in the deaerator can be controlled by sensing the pressure via pressure sensor T and utilizing the sensed pressure to control the vacuum pump 58 through a controller. Vacuum pump 58 is not required to establish a low pressure condition in the deaerator 56. As is discussed below, a vent stream, including steam or vapor, is directed from the downstream evaporator 34 into the deaerator 56. A pressure drop is employed in this vent stream and that pressure drop can be employed to yield a pressure within the deaerator 56 that is below atmospheric pressure. Thus, the low pressure conditions in the deaerator 56 may be established by the pressure drop alone. In other cases, the vacuum pump 58 can be employed to work in conjunction with the pressure drop to yield the desired low pressure in the deaerator 56.

The liquid feed stream discharged from the deaerator 56 flows to the evaporator 34. In the application presented here, the vapor pressure in the deaerator 56 is maintained less than 14.7 psia and the temperature of the vapor in the deaerator is maintained lower than 100° C. If the temperature and pressure are so limited, then the feed stream leaving the deaerator 56 will not boil at atmospheric pressure. It is, however, preferred to adjust the pressure of the feed stream from the deaerator 56 to the evaporator 34 such that it is at atmospheric pressure. Thus, FIG. 1 shows an atmospheric pressure tank 60 disposed in the line between the deaerator 56 and the evaporator 34. Various means can be employed to maintain a pressure below atmospheric pressure in the deaerator 56 and to control the pressure of the feed stream in the line leading from the deaerator to the evaporator 34. In another embodiment, the feed stream can be routed from the deaerator to the evaporator.

To reduce scaling or fouling in the evaporator 34, the pH of the feed stream or the concentrate produced by the evaporator can be raised through a pH adjustment. This tends to increase the solubility of scaling constituents such as silica. Evaporator 34, in this and other embodiments, can be a conventional falling film evaporator that employs mechanical vapor recompression. Evaporator 34 in conventional fashion produces a condensate that is directed to a once-through steam generator or other equipment. In addition, evaporator 34 concentrates the feed stream and produces a concentrate that is directed to a solid-liquid separator 35 that separates solids from the concentrated brine.

Vapor or steam produced in the shell of the evaporator heater can be used in the deaerator 56 to strip dissolved gases from the feed stream and at the same time the pressure of the vapor produced by the evaporator can be adjusted prior to entering the deaerator to yield desired pressure and temperature conditions in the deaerator for efficient dissolved gas removal. As discussed above, the process for removing dissolved gas in the deaerator 56 depends on there being a temperature and pressure relationship between the vapor in the deaerator 56 and the feed stream prior to entering the deaerator. To achieve effective dissolved gas removal, especially the removal of $H_2S$, organics and $CO_2$ with a minimum amount of energy, the temperature of the feed stream should be higher than the saturated vapor temperature in the deaerator 56. Thus, by lowering the pressure and hence the temperature of the vapor from the evaporator 34 before the vapor enters the deaerator 56, this desired temperature differential can be controlled and maintained. The vapor temperature in the deaerator 56 is set by the vapor pressure. Thus, by lowering the pressure of the steam or vapor directed into the deaerator 56 and sufficiently heating the feed stream with the preheater 26, this desired temperature differential can be arrived at and maintained.

As shown in FIG. 1, in the vapor line 21 extending from evaporator 34 to the deaerator 56 there is a means to provide a pressure drop. Vapor produced in the evaporator 34 is routed to a heater shell and a majority of these vapors condense. The heater shell vents a small portion to the deaerator at about 18.5 psia and at a temperature of 107° C. These are the conditions found in line 21 upstream of the pressure drop means. There are various ways (active or passive) of dropping the pressure of the vapor emitted by the evaporator 34. One example entails a control valve in the vapor line to the deaerator 56. The control valve can induce a pressure drop. This can be achieved as a pressure control loop or a flow control loop. There can also be other means of inducing a pressure drop in the vapor stream, such as by a manual vale, a nozzle or orifice.

In this embodiment, the control concept is that this pressure drop and the preheating of the feed stream is used to yield a temperature differential between the vapor temperature in the deaerator 56 and the incoming feed stream.

Figure 2:
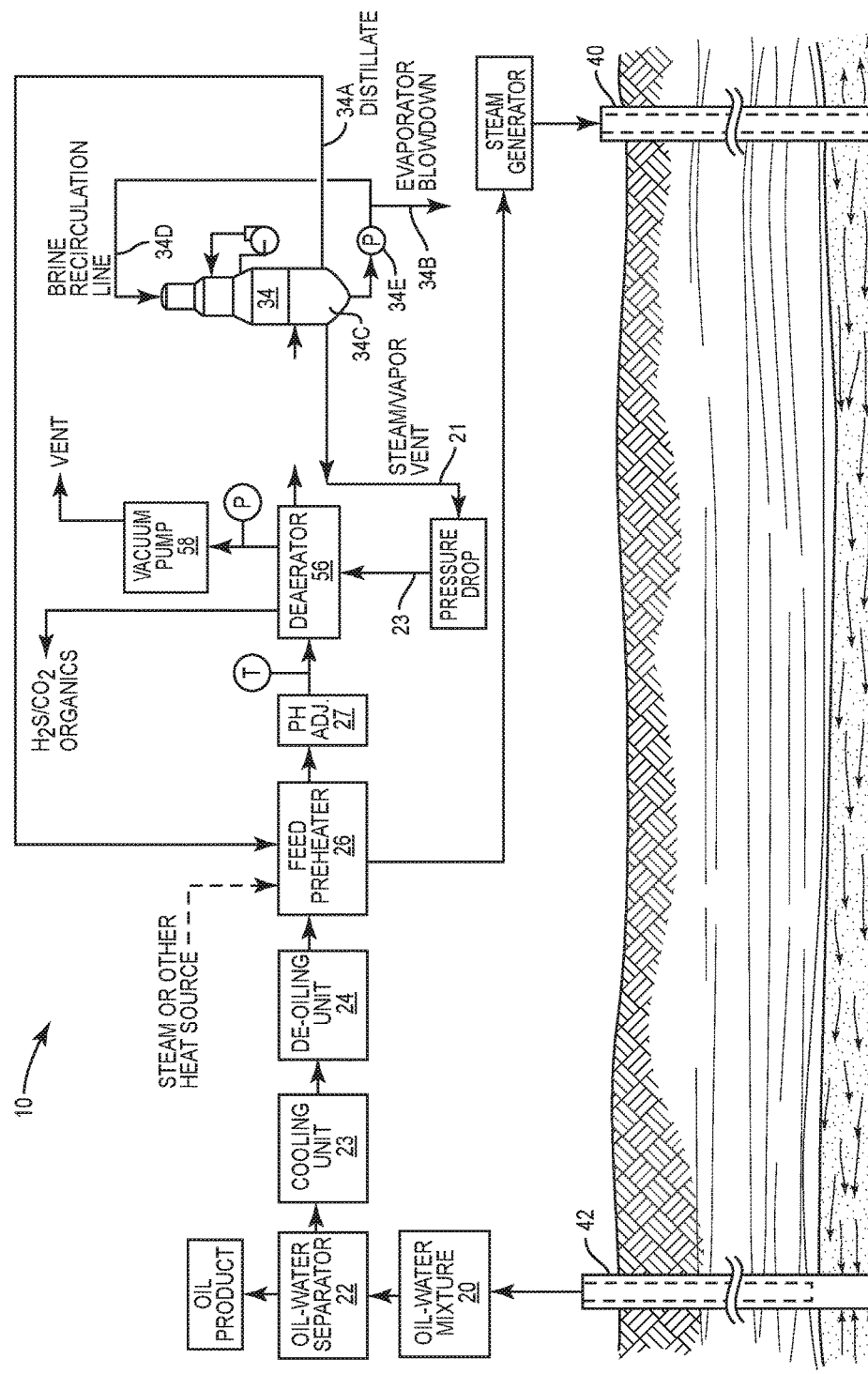
FIG. 2 is a schematic illustration of a produced water process employing a process for removing dissolved gases from a produced water stream upstream of an evaporation process.

The system and process described above and shown in FIG. 1 discloses a general application of the invention. While there are numerous applications of the process, one particular application is treating produced water resulting from the recovery of oil. FIG. 2 shows one example of such a process. As discussed below, the produced water is subjected to an evaporation process. However, before reaching the evaporator 34, dissolved gases such as $H_2S$, organics and $CO_2$ are removed from the produced water in the deaerator 56. As with the FIG. 1 process, the temperature of the produced water is controlled such that it is above the saturated vapor temperature in the deaerator 56. This is achieved by the presence of the pressure drop in the vapor line between the evaporator 34 and the deaerator 56, along with the selective and controlled heating of the produced water before reaching the deaerator.

With reference to FIG. 2, there is shown therein an oil recovery system and process that is indicated generally by the numeral 10. An oil-water mixture 20 is collected from the oil well 42 and pumped to the surface. The oil-water mixture is directed to an oil-water separator 22. This is generally referred to as a primary oil-water separation process. Various conventional oil-water separation systems can be employed. For example, gravity or centrifugal separators can be used to separate the oil-water mixture to yield an oil product and separated water. The oil product is further treated and sold. Typically the produced water has a temperature of approximately 160 to 180° C. To cool the produced water before further processing, the produced water is directed into a cooling unit 23 where the temperature of the produced water is typically reduced to approximately 85° C. In this way, the de-oiling unit 24 can be operated as tanks and not pressure vessels. After the produced water is cooled, it is directed to a de-oiling unit 24 where additional oil is removed. Various de-oiling devices, such as an induced gas flotation system, can be used. In some instances, a de-oiling polymer is added to the water separated by the oil-water separator 22. The output or effluent from the de-oiling unit 24 is referred to as produced water. It is this produced water that is treated and conditioned before being reused to generate steam.

Produced water is directed to a preheater 26 where the produced water is typically heated to a temperature above 100° C. In this embodiment, it is desirable to have the feed temperature above the deaerator operating vapor pressure. As discussed herein, the temperature of the produced water is raised or maintained above the saturated vapor temperature in the downstream deaerator 56. There are various means to heat the produced water. In one embodiment, live steam is directed into the preheater 26 for heating the produced water. In other embodiments, the distillate produced by the downstream evaporator 34 can be directed through the preheater 26. In some cases, a combination of steam and a distillate is used to preheat the produced water.

In some cases, it may be advantageous to adjust the pH of the produced water before reaching the deaerator 56. As seen in FIG. 2, there is provided a pH adjustment unit 27. In one embodiment, an acid is injected and mixed with the produced water to lower the pH. Lowering the pH results in the conversion of alkalinity, such as bicarbonate, to carbon dioxide which can be efficiently removed in the deaerator 56. In any event, the produced water is directed into the deaerator 56 which is located upstream of the evaporator 34. A vapor or steam stream is directed from the evaporator 34 up through the deaerator 56 in a counterflow relationship to the produced water flowing downwardly through the deaerator. This configuration can be used for deaeration of alkalinity but the use of an elevated feed temperature to the deaerator and reducing the deaerator operating pressure enhances stripping of $H_2S$ and other gases.

Note in FIG. 2, line 21 that extends from the evaporator 34 to a block that is denoted pressure drop. From the pressure drop there is a line 23 that is directed into the deaerator 56. Typically the pressure of the vapor in line 21 is approximately 18.5 psia and the vapor is at a temperature of approximately 107° C. The purpose of the pressure drop is to reduce the pressure of the vapor and hence the temperature to a controlled pressure and temperature that will be effective and energy efficient for stripping or removing dissolved gases from the produced water in the deaerator 56. The process aims at reducing the vapor pressure in deaerator 56. This is at least partially achieved by the controlled pressure drop in the vapor lines 21 and 23 between the evaporator and the deaerator. In some cases, a vacuum pump 58 may also be operatively associated with the deaerator 56 to assure that conditions within the deaerator are maintained below atmospheric pressure. Thus, the process described in this embodiment is aimed at heating the produced water or at least maintaining the temperature of the produced water such that the temperature of the produced water is over the saturated vapor temperature in the deaerator. At the same time, the aim of this process is to utilize the pressure drop in the vapor line (lines 21 and 23) between the evaporator 34 and the deaerator 56 to maintain conditions in the deaerator such that the saturated vapor pressure therein is below atmospheric pressure.

From the deaerator 56, the produced water is directed to evaporator 34 where it undergoes an evaporation process. It is desirable to bring the produced water back to atmospheric pressure before reaching the evaporator 34. Therefore, in some embodiments, there is a pressure adjustment function that is effective to establish atmospheric pressure.

Details of the evaporator 34 and the evaporation process will not be dealt with here in detail because such is not per se material to the present invention and the structure and function of evaporators are well known and appreciated by those skilled in the art. Suffice it to say that the evaporator 34 evaporates at least a portion of the produced water and in the process produces steam and a concentrated brine. The steam condenses to form a distillate 34A. Concentrated brine is collected in the sump 34C of the evaporator and recirculated through the evaporator 34 by a pump 34E that pumps the concentrated brine through a brine recirculation line 34D. A portion of the concentrated brine is directed as evaporator blowdown through line 34B which can be directed to a blowdown treatment unit (not shown).

Evaporator distillate 34A is substantially pure. There may be a small amount of dissolved solids, on the order of 10 mg/L or less, in the distillate 34A. In any event, in this embodiment the distillate 34A can be routed through the preheater 26 where the heat energy associated therewith is transferred to the produced water passing through the preheater. In the embodiment shown in FIG. 2, the distillate 34A is directed to a steam generator where the distillate is converted to steam. Various types of steam generators can be employed. For example, the steam generator may include a conventional boiler or package boiler. In addition, the steam generator may be a once-through steam generator (OTSG) that is employed with a steam-water separator for separating steam from a steam-water mixture produced by the OTSG. The steam generator produces steam that is directed into an injection well 40. In the embodiment illustrated in FIG. 2, the injection well 40 is spaced from the oil well 42 that actually produces the oil-water mixture 20. In conventional fashion, steam injected into the injection well 40 migrates horizontally to an area around the oil well 42 where the steam mixes with the oil in the oil well or oil-bearing formation and condenses to reduce the viscosity of the oil and generally mobilize the oil to produce the oil-water mixture 20 referred to above.

There are numerous advantages to the present process for removing dissolved gases from evaporator feed streams. In many conventional processes, there is incorporated into the system and process a waste gas stripper. In one embodiment of the present process, the waste gas stripper is eliminated. The process also allows for the reduction or elimination of makeup steam for preheating the feed stream. More particularly, it eliminates the need for live steam or at least maintains a neutral heat balance. By raising the temperature of the feed stream above the saturated vapor temperature in the deaerator 56, this enables the deaerator to function as a steam stripper. Further, the process employs a unique approach of using pressure reduction in the evaporator vent steam to the deaerator to maintain an appropriate back pressure on the heater shell of the evaporator and to maintain a vacuum in the deaerator.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil from an oil well, comprising:
   recovering an oil-water mixture from the well;
   separating the oil-water mixture to produce an oil product and produced water;
   directing the produced water to and through a deaerator;
   after the produced water has been directed through the deaerator, directing the produced water to an evaporator and producing a concentrated brine and steam;
   condensing the steam to form a distillate;
   directing the distillate to a steam generator and producing steam;
   injecting at least a portion of the steam into an injection well;

stripping dissolved gas from the produced water upstream of the evaporator by directing steam from the evaporator through a steam line into and through the deaerator;

maintaining a vapor pressure in the deaerator below atmospheric pressure by dropping the pressure of the steam in the steam line; and prior to the produced water entering the deaerator, heating the produced water to a temperature greater than a saturated vapor temperature in the deaerator.

2. The method of claim 1 including heating the produced water to a temperature above 100° C. before the produced water reaches the deaerator.

3. The method of claim 1 including establishing both the pressure and temperature of the vapor in the deaerator by subjecting the steam being directed from the evaporator to the deaerator to the pressure drop at a point between the evaporator and the deaerator.

4. The method of claim 1 wherein the steam directed from the evaporator to the deaerator is evaporator vent steam, and the method comprises maintaining the vapor pressure in the deaerator lower than the pressure of the evaporator vent steam.

5. The method of claim 1 including maintaining the temperature of the vapor in the deaerator less than 100° C. and heating the produced water upstream of the deaerator to a temperature greater than 100° C.

6. The method of claim 1 including maintaining the temperature of the vapor in the deaerator at less than 100° C.; and heating the produced water to a temperature greater than 100° C. before reaching the deaerator.

7. The method of claim 6 including providing no waste gas stripping of the produced water at any point upstream of the deaerator.

8. The method of claim 1 including operatively connecting a vacuum pump to the deaerator and employing the vacuum pump to assist in maintaining the vapor pressure in the deaerator less than atmospheric pressure.

9. The method of claim 1 further including, at a point between the deaerator and the evaporator, adjusting the pressure of the produced water to atmospheric pressure.

10. The method of claim 1 wherein the dissolved gas includes $H_2S$ and $CO_2$ and the method includes stripping $H_2S$ and $CO_2$ from the produced water in the deaerator.

11. A method of treating a feedwater stream with an evaporator, wherein the feedwater stream is produced water, comprising:

directing the feedwater stream to and through a deaerator;

after directing the feedwater stream to and through the deaerator, directing the feedwater stream to the evaporator;

evaporating the feedwater stream in the evaporator and producing a concentrate and steam;

directing at least a portion of the steam produced by the evaporator through a steam line to and through the deaerator and stripping dissolved gas from the feedwater stream passing through the deaerator;

maintaining a vapor pressure in the deaerator at less than atmospheric pressure by dropping the pressure of the steam in the steam line;

maintaining a temperature of the vapor in the deaerator at less than 100° C.; and prior to the feedwater stream entering the deaerator, heating the feedwater stream to a temperature greater than a saturated vapor temperature in the deaerator.

12. The method of claim 11 including heating the feedwater stream to a temperature of 100° C. before the feedwater stream reaches the deaerator.

13. The method of claim 11 including establishing both the pressure and temperature of the vapor in the deaerator by subjecting the steam in the steam line to the pressure drop between the evaporator and the deaerator.

14. The method of claim 11 wherein the steam directed from the evaporator to the deaerator is evaporator vent steam, the method includes maintaining the vapor pressure in the deaerator at a pressure less than the pressure of the evaporator vent steam.

15. The method of claim 11 including operatively connecting a vacuum pump to the deaerator and employing the vacuum pump to assist in maintaining the vapor pressure in the deaerator less than atmospheric pressure.

16. The method of claim 11 including maintaining the temperature of the vapor in the deaerator at less than 100° C.; and heating the feedwater stream to a temperature greater than 100° C. before the feedwater stream is directed in to the deaerator.

17. The method of claim 11 wherein the dissolved gas includes $H_2S$ and $CO_2$ and the method includes stripping $H_2S$ and $CO_2$ from the feedwater stream in the deaerator by directing the feedwater stream downwardly through the deaerator and directing steam from the evaporator upwardly through the deaerator.

18. A method of recovering oil from an oil well, comprising:

recovering an oil-water mixture from the well;

separating the oil-water mixture to produce an oil product and produced water;

directing the produced water to and through a deaerator;

after the produced water has been directed through the deaerator, directing the produced water to an evaporator and producing a concentrated brine and steam;

condensing the steam to form a distillate;

directing the distillate to a steam generator and producing steam;

injecting at least a portion of the steam into an injection well;

venting steam from the evaporator to form vent steam and directing the vent steam through a vent steam line to the deaerator;

directing the vent steam through the deaerator and stripping dissolved gases from the produced water passing through the deaerator;

maintaining the vapor pressure in the deaerator below atmospheric pressure;

maintaining a vapor temperature in the deaerator below 100° C.;

maintaining a vapor pressure in the deaerator below atmospheric pressure and maintaining the vapor temperature in the deaerator below 100° C. is accomplished, in part at least, by subjecting the vent steam in the vent steam line to a pressure drop at a point between the evaporator and the deaerator; and heating the produced water to a temperature greater than a saturated vapor temperature in the deaerator and greater than 100° C. before the produced water enters the deaerator.

* * * * *